United States Patent Office 2,871,232
Patented Jan. 27, 1959

2,871,232

CHROMIC SALTS OF o-ALKOXY-o'-HYDROXY MONOAZO COMPOUNDS

Ernest Csendes, Wilmington, Del., assignor to E. I. du Pont de Nemours and Company, Wilmington, Del., a corporation of Delaware No Drawing. Application June 7, 1956
Serial No. 589,864

5 Claims. (Cl. 260—147)

This invention relates to novel azo compounds containing chromium and being useful as intermediates in the production of chromium azo dyes. More particularly, this invention deals with novel 1:1 chromic complex salts of o,o'-dihydroxy monoazo compounds in which one of the hydroxy groups is alkylated by a short chain alkyl radical (1 to 6 C-atoms).

By 1:1 here is meant that the compound contains 1 Cr atom and 1 azo bridge.

The novel compounds of this invention comprise the compounds of the general formula

(1)

wherein A' represents an azo component of the group consisting of unsubstituted and substituted benzene, naphthalene and 1-aryl-3-methyl-5-pyrazolone nuclei, the substituents being selected from the group consisting of lower alkyl (1 to 6 C-atoms), Cl, Br, F, $NO_2$, $SO_2NH_2$, $SO_2NHR$, $SO_2NRR$, $SO_2R$, $CONH_2$, CONHR, COR, OR, NHCOR, and NHCONHR, R in each instance being an alkyl group having less than 7 carbon atoms, A represents an azo component of the same group but excluding the aryl-methyl-pyrazolones, and wherein A and A' may be alike or different. $\bar{X}$ and $\bar{Y}$ are anions selected from the group consisting of Cl, Br, F, $SO_4$, acetate, formate, tartrate, lactate and salicylate. It will be noted that the novel compounds of this invenion are free of acid reacting substituents such as $SO_3H$ and COOH.

The novel compounds, which may be isolated as such or as hydrates, are useful as intermediates for the manufacture of 1:2 chromium complex azo dyes (meaning compounds having 2 azo bridges coordinated with 1 Cr atom), and particularly for the manufacture of such 1:2 complexes having an unsymmetrical structure, by condensing said 1:1 complex with one mole of a non-metallized, chromable azo dye.

Dyes of the 1:2 type are common on the market and are generally useful for dyeing nylon and wool, particularly in blends with cellulosic fibers. They are applicable from a neutral bath and are usually remarkable for their light fastness on nylon.

Dyes of this type have hitherto been synthesized by employing non-alkylated 1:1 chromium complex monoazo dyes of the above general structure. In fact, there seems to have been a common belief in the art, that the chromated complex intermediate cannot be produced except by first completely dealkylating the o-hydroxy-o'-alkoxy monoazo dye from which it is produced.

I now find not only that by modifying the process of chromation I can produce the chromium complex of the monoazo intermediate without dealkylating the alkoxy group, but that such intermediate has outstanding merit in its utility for producing 1:2 chromium azo dyes, in that the latter are obtained in a state of exceptionally high purity. This effect is perhaps due to the fact that the intermediate itself is produced in a state of high purity by following my novel procedure, which can be readily demonstrated by chromatographic analysis.

Accordingly, my invention comprises first a method for producing compounds of Formula 1 above, without simultaneous dealkylation of the ortho alkoxy group. Secondly, my invention contemplates a method for producing said compounds in a state of high purity, free from unstable by-products and from by-product coloring impurities. Thirdly, my invention comprises a series of novel chromium monoazo compounds of outstanding merit as intermediates for the production of 1:2 chromium azo dyes. Other objects, achievements and advantages of my invention will appear as the description proceeds.

As a general proposition, my novel procedure for producing intermediates of the above general formula comprises heating 1 mole of monoazo compound of the formula

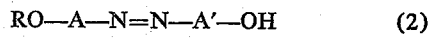
(2)

wherein A, A' and R have the same significance as above, with 1 mole or more of a chromic salt in a glycol solvent, for instance ethylene glycol, at a temperature of about 120° to 150° C. and at a pH of about 4.5 to 5.0, until formation of the 1:1 complex is complete, as shown by a chromatographic test, then drowning the reaction mass into a concentrated salt solution, and filtering off the chromium azo complex.

Any chromic salts which are soluble in ethylene glycol may be employed, for instance chromic chloride, bromide, fluoride, sulfate, acetate, formate, tartrate, lactate, salicylate or the various hydrates of these salts. Although a 1:1 ratio is aimed at in the resulting intermediate, an excess of the chromium compound, up to 2 moles Cr per mole of the azo compound, may be employed.

The acidity of the reaction mass is controlled within the limits of 4.5 to 5.0 by testing with indicators and adding small quantities of concentrated HCl if and as needed.

It will be noted that the chromation of the monoazo compound of Formula 2 hereinabove, has hitherto been practiced in the art in aqueous medium and under strongly acidic conditions, and that the reaction was generally prolonged to insure splitting off of the alkyl radical. My invention apparently is successful in retaining the alkyl group due to the relatively milder conditions of chromation.

As already indicated, by novel monoalkylated chromium azo compounds are useful for the production of 1:2 chromium azo dyes. This conversion can be achieved by condensing, in a glycol solvent, for instance ethylene glycol, at a temperature of 135° to 145° C. and at a pH of 7.5 to 8.5 (controlled by addition of conc. NaOH, if need be) 1 mole of my novel 1:1 complex with 1 mole of a non-metallized o,o'-dihydroxy azo compound. By varying the choice of the latter compound numerous dyes of various constitutions and shades can be produced.

It is remarkable that although the o-alkoxy group on my novel intermediate does not split off during its own chromation, it becomes eliminated upon subsequent condensation of the intermediate with another molecule of a chromable azo dye as above indicated.

Without limiting my invention, the following examples are given to illustrate my preferred mode of operation. Parts mentioned are by weight.

*Example 1*

(a) 17.1 parts of the azo dye, prepared by coupling diazotized 4-chloro-2-amino-anisole to 1-phenyl-3-methyl-5-pyrazolone, were added in small portions to a freshly prepared solution of 27.0 parts $CrCl_3.6H_2O$ in 250 parts of ethylene glycol of 140° C. The pH of this solution was 5.0. After all the azo dye added had dissolved, heating was continued for approximately 30 minutes, whereupon the 1:1 Cr-dye complex was formed, in high purity, as shown by the chromatographic test described below. The glycol solution of this complex was dark orange red. A small sample of this solution when diluted with water, showed no shade change or precipitation on addition of acid, but changed to a yellow orange on addition of alkali.

The glycol solution of the complex was cooled to 80° C. and added under stirring to 550 parts of a 25% NaCl solution. The 1:1 complex precipitated in crystalline form and was isolated by filtration and drying at 75° C. The chromatogram of the isolated material was similar to that of the 1:1 complex in ethylene glycol solution. Ignoring water of hydration which is probably present in the molecule, the 1:1 complex obtained corresponds to the formula:

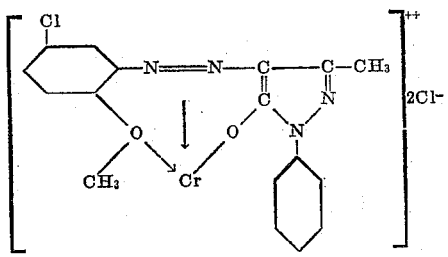

*Analysis.*—Cr: calc. (for a trihydrate), 10.02%; found, 10.08%. N: calc. (for a trihydrate), 10.8; found, 11.15%.

*Chromatographic test.*—Two to four drops of the reaction mixture (ethylene glycol solution) were diluted with one to two ml. of dimethyl formamide and brought on a chromatographic silica column prepared from a slurry of a commercial silica-basis absorbent in benzene. (A convenient absorbent for this purpose is "Florisil," whose composition is defined in U. S. P. 2,393,625.) After absorbing the dye, the column was eluted with a 4:1 mixture of benzene and dimethylformamide.

When an impure chromium complex solution is employed, the chromatographic process will generally yield three zones of color: The 1:1 complex produces an orange-red band at the top of the column; the unmetallized azo dye goes down the column as a yellow band; any 1:2 complex present in the mixture produces an orange-red band further down the column. In the test, however, applied to the product of this example, a single orange-red band on the top of the column was produced, indicating that the product was essentially free of unreacted azo dye and of 1:2 chromation complexes.

(*b*) In lieu of the azo dye indicated in part (*a*), the azo dye obtained from 4-chloro-2-amino-phenetol and 1-phenyl-3-methyl-5-pyrazolone, was employed. The resulting 1:1 complex is the ethyl homolog of the compound formulated in part (*a*).

(*c*) A similar 1:1 complex was obtained when 4-chloro-2-amino-phenyl-n-hexyl ether diazotized and coupled to 1-phenyl-3-methyl-5-pyrazolone was used in lieu of the azo dye named in part (*a*). Its constitution corresponds to the formula above, except that the CH$_3$ group on the left is replaced by the n-hexyl radical, C$_6$H$_{13}$.

The amount of ethylene glycol and the length of heating in the above procedures depends on the solubility of the azo dye. An azo dye having one or two sulfonamide groups is operative under similar conditions as in Example 1(*a*), whereas azo dyes containing nitro groups and no sulfonamide groups require somewhat more ethylene glycol and a longer heating period, say up to 90 minutes.

(*d*) Using the procedure of part (*a*), the following azo dyes have been converted into a 1:1 chromic complex:

4-fluoro-2-amino-anisole→PMP (1 - phenyl - 3 - methyl-5-pyrazolone)
4-bromo-2-amino-anisole→PMP
4-acetylamino-2-amino-anisole→PMP
4-ethylureido-2-amino-anisole→PMP
4-acetyl-2-amino-anisole→PMP
4-butyryl-2-amino-anisole→PMP
4-nitro-2-amino-anisole→PMP
4-methylsulfonyl-2-amino-anisole→PMP
4-ethylsulfonyl-2-amino-anisole→PMP
4-n-hexylsulfonyl-2-amino-anisole→PMP
4-sulfamyl-2-amino-anisole→PMP
4-N-methyl-sulfamyl-2-amino-anisole→PMP
4-N-propyl-sulfamyl-2-amino-anisole→PMP
4-N-hydroxyethyl-sulfamyl-2-amino-anisole→PMP
4-N,N-diethyl-sulfamyl-2-amino-anisole→PMP
4-N,N-di-2-hydroxyethyl-sulfamyl-2-amino-anisole→PMP
4-N-hexyl-sulfamyl-2-amino-anisole→PMP
3-amino-4-methoxy-benzamide→PMP
4-N-methyl-carbamyl-2-amino-anisole→PMP
4-N-hexyl-carbamyl-2-amino-anisole→PMP
2-amino-anisole→PMP
5-chloro-2-amino-anisole→PMP
5-bromo-2-amino-anisole→PMP
5-nitro-2-amino-anisole→PMP
4-methyl-2-amino-anisole→PMP
4-hexyl-2-amino-anisole→PMP
4-chloro-2-amino-anisole→4′-sulfamyl-PMP
4-chloro-2-amino-anisole→3′-sulfamyl-PMP
4-nitro-2-amino-anisole→3′-sulfamyl-PMP
4-sulfamyl-2-amino-anisole→3′-sulfamyl-PMP
4-N-methylsulfamyl-2-amino-anisole→3′-sulfamyl-PMP
3-amino-4-methoxy-benzamide→3′-sulfamyl-PMP
2-amino-anisole→3′-sulfamyl-PMP
4-methyl-2-amino-anisole→3′-sulfamyl-PMP
4-sulfamyl-2-amino-anisole→4′-chloro-PMP
4-sulfamyl-2-amino-anisole→4′-nitro-PMP
4-sulfamyl-2-amino-anisole→1 - naphthyl-3-methyl-5-pyrazolone
1-amino-2-ethoxy-naphthalene→PMP
1-amino-2-ethoxy-naphthalene→3′-sulfamyl-PMP
1-amino-2-ethoxy-6-sulfamyl-naphthalene→PMP
1-amino-2-ethoxy - 6 - sulfamyl-naphthalene→3′-sulfamyl-PMP
4-chloro-2-amino-anisole→4-methyl-phenol
4-chloro-2-amino-anisole→4-isopropyl-phenol
4-nitro-2-amino-anisole→4-methyl-phenol (*e*) When the 1:1 chromium salt of part (*a*) was dried at 90° C. and for a longer period, hydrolysis of the salt was observed. A less soluble material was obtained which showed a lower chloride content. The structure of this hydrolysis product (ignoring any water of hydration) is

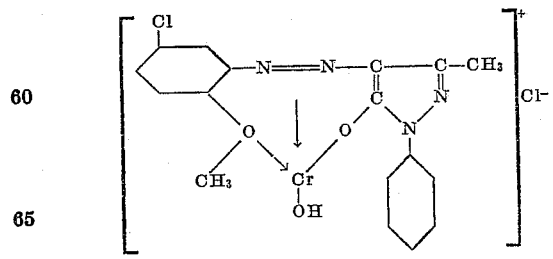

(*f*) The chromic chloride in part (*a*) can be replaced by Cr$_2$(SO$_4$)$_3$.18H$_2$O, CrF$_3$.9H$_2$O, CrBr$_3$.6H$_2$O or Cr(O·CHO)$_3$.6H$_2$O (chromic formate hexahydrate); in each case the corresponding 1:1 chromic complex salt is obtained.

*Example 2*

(*a*) 25 parts of the azo dye prepared by coupling diazotized 2,5-dimethoxyaniline with 2-naphthol were added to 240 parts of ethylene glycol and stirred to a smooth slurry. Then 24 parts of $CrCl_3.6H_2O$, finely powdered, were added and the reaction mass was heated to 148° C. for 1.5 hours. At the end of this period the chromatographic test showed the formation of a pure 1:1 complex. A small sample of this solution when diluted with water is dark blue colored; addition of acid does not precipitate the dye; addition of alkali changes the shade to a red-violet.

After cooling the reaction mass to 80° C., it was drowned in 300 parts of 25% NaCl solution and the 1:1 Cr-complex was isolated by filtration and drying at 75° C.

*Analysis.*—Cr/N ratio: calc., 1.857; found, 1.855.

The 1:1 complex obtained has (ignoring any hydration) the following structure:

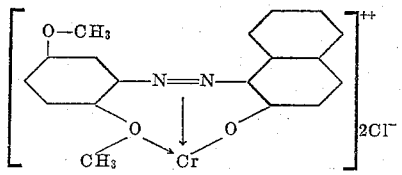

(b) When using the azo dye derived from 2,5-diethoxy-aniline in lieu of the azo dye specified in part (a) of this example, the corresponding complex with two ethoxy groups, instead of methoxy groups, was obtained.

*Example 3*

(a) 55 parts of $CrCl_3.6H_2O$ were added to 800 parts of ethylene glycol and heated to 140° C. 71.2 parts of the azo dye obtained by coupling 4-chloro-2-amino-anisole to 2-naphthol-6-sulfonamide were added in small portions so that each added portion dissolves. After all the azo dye was added, heating was continued for another 50 minutes. At the end of this period, the chromatographic test indicated the formation of a 1:1 complex in high purity. After cooling to 80° C., the solution was drowned in 1500 parts of a 25% salt solution, and the 1:1 complex was isolated by filtration and drying. The 1:1 complex obtained (ignoring the hydration) corresponds to the structure:

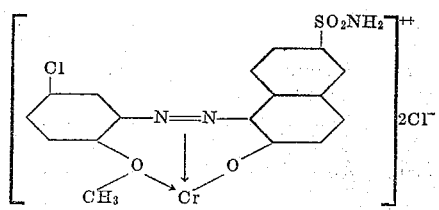

It will be noted that in the procedure of this example the quantity of chromic salt employed is not essentially in excess of the stoichiometric amount.

(b) Using the procedure of either Example 2(a) or 3(a), the following azo dyes have been converted into the corresponding 1:1 complex:

4-chloro-2-amino-anisole→2-naphthol-6-sulfonamide
4-fluoro-2-amino-anisole→2-naphthol-6-sulfonamide
4-bromo-2-amino-anisole→2-naphthol-6-sulfonamide
4-acetylamino - 2-amino-anisole→2 - naphthol-6 - sulfonamide
4-ethylureido-2-amino - anisole→2- naphthol - 6 - sulfonamide
4-acetyl-2-amino-anisole→2-naphthol-6-sulfonamide
4-nitro-2-amino-anisole→2-naphthol-6-sulfonamide
4-methylsulfonyl - 2 - amino-anisole→2-naphthol-6-sulfonamide
4-sulfamyl-2-amino-anisole→2-naphthol-6-sulfonamide
4-N-methylsulfamyl-2-amino - anisole→2- naphthol-6-sulfonamide
4-N-hydroxyethylsulfamyl - 2-amino-anisole→2-naphthol-6-sulfonamide
3-amino-4 - methoxy - benzamide→2-naphthol - 6 - sulfonamide
5-chloro-2-amino-anisole→2-naphthol-6-sulfonamide
5-nitro-2-amino-anisole→2-naphthol-6-sulfonamide
2-amino-anisole→2-naphthol-6-sulfonamide
4-methyl-2-amino-anisole→2-naphthol-6-sulfonamide
4-chloro-2-amino-anisole→2-naphthol-4-sulfonamide
4-chloro-2-amino-anisole→2-naphthol-7-sulfonamide
4-chloro-2-amino-anisole→1-naphthol-4-sulfonamide
4-chloro-2-amino-anisole→1-naphthol-5-sulfonamide
4-chloro-2-amino-anisole→1-naphthol-3-sulfonamide
4-chloro-2-amino-anisole→1-naphthol-3,6-disulfonamide
4-chloro-2-amino-anisole→2-naphthol
4-chloro-2-amino-anisole→4-methyl-1-naphthol
4-chloro-2-amino-anisole→8-acetylamino-2-naphthol
4-chloro-2-amino-anisole→6-methoxy-2-naphthol
2,5-dimethoxy-aniline→2-naphthol
2,4-dimethoxy-aniline→2-naphthol
1-amino - 2 - ethoxy-naphthalene→2 - naphthol-6 - sulfonamide
1-amino - 2-ethoxy-naphthalene-6-sulfonamide→2 - naphthol-6-sulfonamide
1-amino-2 - ethoxy-naphthalene-6 - sulfonamide→2-naphthol
1-amino - 2 - ethoxy-naphthalene→1-naphthol-5 - sulfonamide It will be understood that the details of the above examples may be varied considerably within the skill of those engaged in this art. Thus, the salts hereinabove named may be reacted in glycol solution with the sodium salts of various organic acids to replace the anions by the corresponding organic acid radicals. In some cases non-ionic chromium complexes may be thus produced. For instance, using sodium salicylate, products of the following general formula may be produced

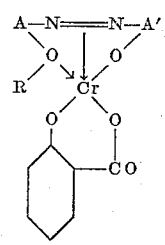

wherein A, A' and R have the same significance as in Formula 1 above.

In lieu of ethylene glycol in the synthesis, other alcoholic solvents which are liquid under the selected reaction conditions may be employed, for instance propylene glycol, butylene glycol, diethylene glycol, the lower monoalkyl ethers of ethylene glycol ("Cellosolves"), the lower monoalkyl ethers of diethylene glycol ("Carbitols"), butanol, etc.

In lieu of the temperatures specified in the examples, other temperatures in the range of 120° to 150° C. may be used.

The utility of my novel compounds resides principally in their ideal adaptability for condensation with other azo dyes to produce 1:2 chromium complex azo dyes of highest purity. The nature of this conversion is illuminated by the following typical reactions:

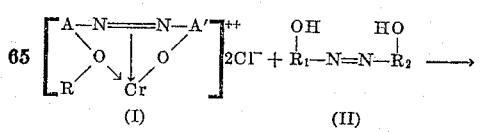

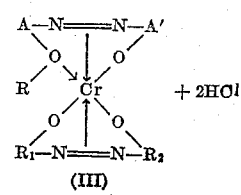

(III) + NaOH ⟶ 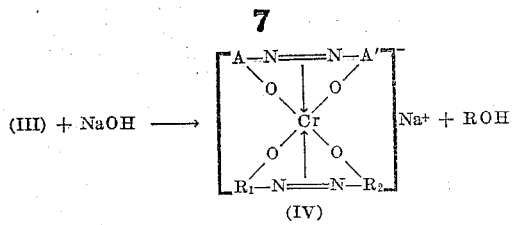 Na⁺ + ROH (IV)

R₁ and R₂ in the above formulas are optional azo-dye components.

While the same general conversion has been carried out in the art heretofore, using non-alkylated 1:1 chromium azo dye complexes, my present invention has the advantage that by using the novel intermediates of this invention, it is possible to prepare the 1:2 colors (of type IV above) in much purer forms and, therefore, of better fastness qualities. When the more strenuous metalization conditions of the prior art are followed, one obtains hydrolysis of the alkoxy group in the 1:1 complex, and this leads to mixtures of dyes in the final condensation product.

I claim as my invention:

1. Compounds of the formula

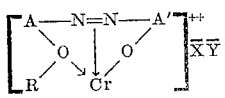

wherein R represents an alkyl radical of not over 6 C-atoms, A' represents an azo component of the group consisting of unsubsituted and substitued benzene, naphthalene, 1-phenyl-3-methyl-5-pyrazolone and 1-napthyl 3-methyl-5-pyrazolone nuclei, whose substituents are selected from the group consisting of alkyl of not over 6 C-atoms, Cl, Br, F, NO₂, SO₂NH₂, SO₂NHR, SO₂NRR, SO₂R, CONH₂, CONHR, COR, OR, NHCOR, and NHCONHR, R in each instance being an alkyl group having less than 7 carbon atoms, A represents an azo component of the same group but excluding the arylmethyl-pyrazolones, and wherein X̄ and Ȳ are anions selected from the group consisting of Cl, Br, F, SO₄, acetate, formate, tartrate, lactate and salicylate.

2. A 1:1 chromic complex salt of the azo dye defined by the formula

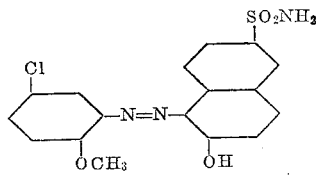

said complex having the OCH₃ group bound by a coordinate valency to the chromium atom.

3. A 1:1 chromic complex salt of the azo dye defined by the formula

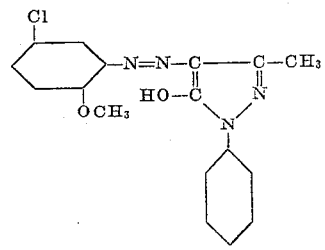

said complex having the OCH₃ group bound by a coordinate valency to the chromium atom.

4. The process of producing a 1:1 chromic complex salt of a monoazo dye containing an ortho alkoxy group of not more than 6 C-atoms in position orth to the azo bridge and bound by a coordinate valency to the chromium atom, which comprises heating one mole of an o-alkoxy-o'-hydroxy azo dye of the formula

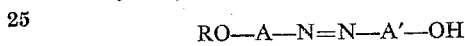

wherein R is an alkyl radical of not over 6 C-atoms and A and A' have the same significance as in claim 1, with from one to two moles of a chromic salt in a glycol solvent at a temperature of about 120° to 150° C. and a pH of about 4.5 to 5.0 until the formation of the 1:1 chromic complex in a state of high purity as shown by chromatographic analysis is essentially complete, and recovering the chromic complex salt thus produced.

5. A process as in claim 4, wherein recovery is effected by drowning the reaction mass into a concentrated salt solution and filtering off the chromium-azo dye complex.

References Cited in the file of this patent

UNITED STATES PATENTS

| | | |
|---|---|---|
| 1,693,448 | Krzikalla et al. | Nov. 27, 1928 |
| 2,008,602 | Straub et al. | July 16, 1935 |
| 2,709,698 | Seruto | May 31, 1955 |
| 2,730,521 | Schetty et al. | Jan. 10, 1956 |
| 2,749,332 | Buehler et al. | June 5, 1956 |
| 2,756,223 | Schetty | July 24, 1956 |
| 2,767,166 | Strobel et al. | Oct. 16, 1956 |